United States Patent [19]

de Leeuw van Weenen et al.

[11] Patent Number: 5,511,191
[45] Date of Patent: Apr. 23, 1996

[54] STATUS MONITORING ARRANGEMENT FOR A DATA PROCESSING SYSTEM COMPRISING A NUMBER OF MANAGED OBJECTS

[75] Inventors: Marcus J. de Leeuw van Weenen, Salford; Kevin Glynn, Manchester; Gareth I. Jenkins, Bracknell, all of England

[73] Assignee: International Computers Limited, London, England

[21] Appl. No.: 447,835

[22] Filed: May 23, 1995

Related U.S. Application Data

[63] Continuation of Ser. No. 189,042, Jan. 31, 1994, abandoned.

[30] Foreign Application Priority Data

Feb. 5, 1993 [GB] United Kingdom .................. 9302225

[51] Int. Cl.$^6$ .................................................. G06F 11/32
[52] U.S. Cl. .................. 395/600; 395/650; 395/184.01; 364/DIG. 1; 364/264.7
[58] Field of Search ................................ 395/600, 575, 395/650, 200; 364/200

[56] References Cited

U.S. PATENT DOCUMENTS

| | | | |
|---|---|---|---|
| 4,644,532 | 2/1987 | George et al. | 370/112 |
| 4,849,879 | 7/1989 | Chinnaswamy et al. | 395/60 |
| 4,918,602 | 4/1990 | Bone et al. | 364/401 |
| 5,001,628 | 3/1991 | Johnson et al. | 395/600 |
| 5,007,017 | 4/1991 | Kobayashi | 395/200 |
| 5,128,878 | 7/1992 | Gore et al. | 395/162 |
| 5,163,131 | 11/1992 | Row et al. | 395/200 |
| 5,218,697 | 6/1993 | Chung | 395/650 |
| 5,220,596 | 6/1993 | Patel | 379/94 |
| 5,287,453 | 2/1994 | Roberts | 395/200 |
| 5,317,568 | 5/1994 | Bixby et al. | 370/85.6 |
| 5,323,393 | 6/1994 | Barrett et al. | 370/85.8 |

FOREIGN PATENT DOCUMENTS

| | | |
|---|---|---|
| 0259224 | 3/1988 | European Pat. Off. . |
| 0474059 | 3/1992 | European Pat. Off. . |
| WO92/05485 | 4/1992 | WIPO . |

OTHER PUBLICATIONS

Joyce et al., "Monitoring Distributed Systems", ACM Transactions On Computer Systems, vol. 5, No. 2, May, 1987, pp. 121–150.

*Primary Examiner*—Thomas G. Black
*Assistant Examiner*—C. Pham
*Attorney, Agent, or Firm*—Lee, Mann, Smith, McWilliams, Sweeney & Ohlson

[57] ABSTRACT

A data processing system comprises a number of managed objects, such as processors, a file system, a communications facility, a power supply, database services, and databases. A number of composite managed objects are defined, each including a number of the managed objects and/or composite managed objects as members. The statuses of the managed objects are monitored, and the status of each composite managed object is set by aggregating the status of all the members of that composite managed object. By aggregating the status of objects in this way, the operator's view of the system is simplified, making the task of managing the system significantly easier. The aggregation is performed using a rules database holding information defining a set of rules for aggregating the status of the members of each managed object.

8 Claims, 2 Drawing Sheets

STATUS MONITORING ARRANGEMENT FOR A DATA PROCESSING SYSTEM COMPRISING A NUMBER OF MANAGED OBJECTS

This application is a continuation of application Ser. No. 189,042, filed Jan. 31, 1994, now abandoned.

BACKGROUND TO THE INVENTION

This invention relates to data processing systems. More specifically, the invention is concerned with management of a data processing system comprising a large number of managed objects. The invention is particularly, although not exclusively, applicable to a distributed data processing network comprising a number of individual end-systems, each of which comprises a number of managed objects.

By a managed object is meant an object that is required to be managed by an operator or system administrator. Such managed objects may include, for example, individual processing elements, file systems, communications facilities, database services, and so on.

A problem with such a system is that the operator's view of the system can be very complex, and the operator requires a considerable degree of skill to monitor and to react to events in the system.

The object of the present invention is to provide a means for reducing such problems.

SUMMARY OF THE INVENTION

According to the invention there is provided a data processing system comprising:
(a) a plurality of managed objects,
(b) means for monitoring the status of the managed objects,
(c) means for defining a plurality of composite managed objects each including a plurality of said managed objects and/or composite managed objects as members, and
(d) means for setting the status of said composite managed objects by aggregating the status of all the members of each composite managed object.

It will be seen that, by aggregating the status of individual objects, the operator's view of the system is simplified, and hence the task of managing the system is made easier.

DESCRIPTION OF AN EMBODIMENT OF THE INVENTION

One data processing system in accordance with the invention will now be described by way of example with reference to the accompanying drawings.

Figure 1:
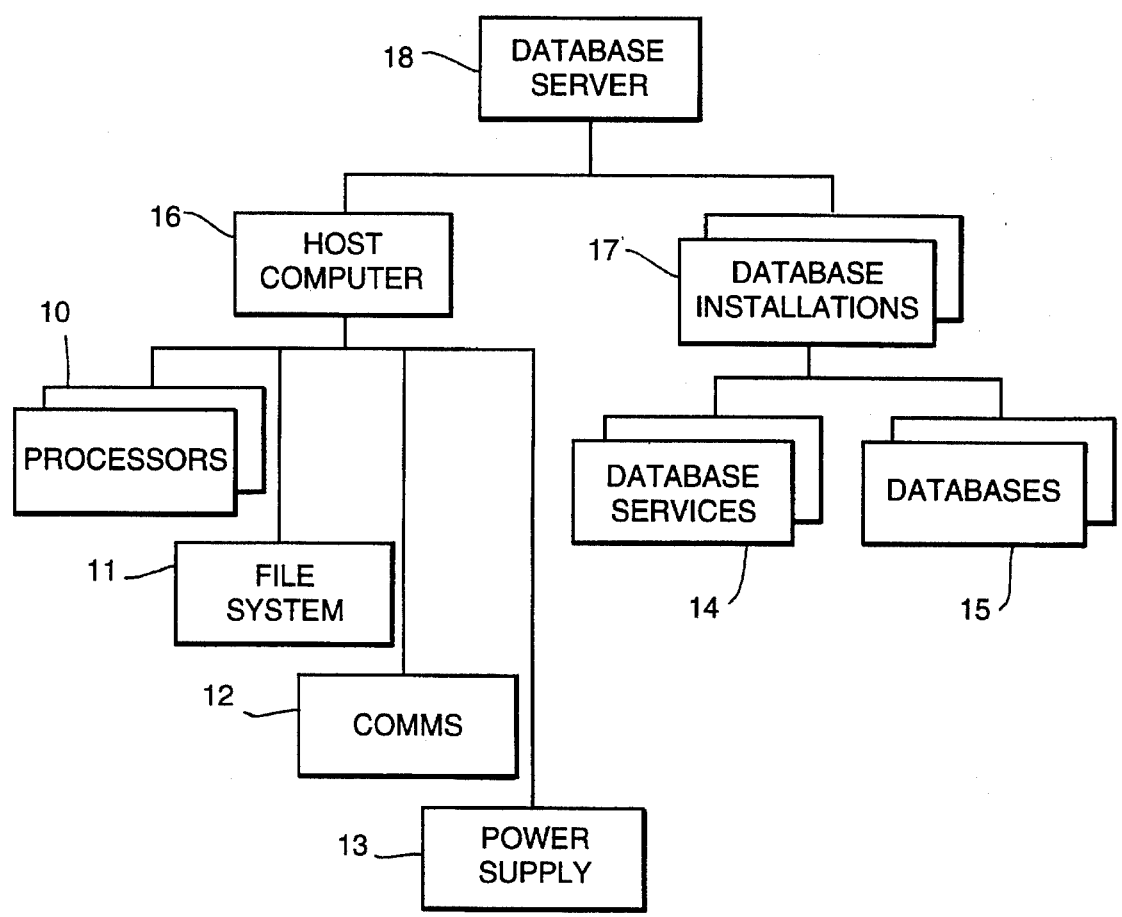
FIG. 1 is a schematic diagram of a data processing system including a number of managed objects and composite managed objects.

Referring to FIG. 1, the data processing system comprises the following managed objects: data processing elements 10, a file system 11, a communications facility 12, a power supply 13, database services 14 and databases 15.

In this example, each of these managed objects has associated with it an operational status and an administrative status. However, it should be noted that in other embodiments of the invention, other status types may be defined.

The operational status has one of the following values: unknown, disabled, no heartbeat, no report, no control, enabled, busy, active. The administrative status has one of the following values: unknown, locked, shutting down, unlocked.

These managed objects are combined, from the operator's point of view, into composite managed objects. Thus, the processors 10, file system 11, communications facility 12 and power supply 13 are combined to form a composite managed object referred to as the host computer 16. The database services 14 and databases 15 are combined to form a set of composite managed objects referred to as database installations 17. The host computer 16 and database installations 17 are in turn, combined to form a composite managed object referred to as the database server 18, which represents the operator's top-level view of the system.

Each composite managed object has operational and administrative status values which are formed, as will be described, by aggregation of the status values of its members, ie the managed objects (or composite managed objects) from which it is formed.

Figure 2:
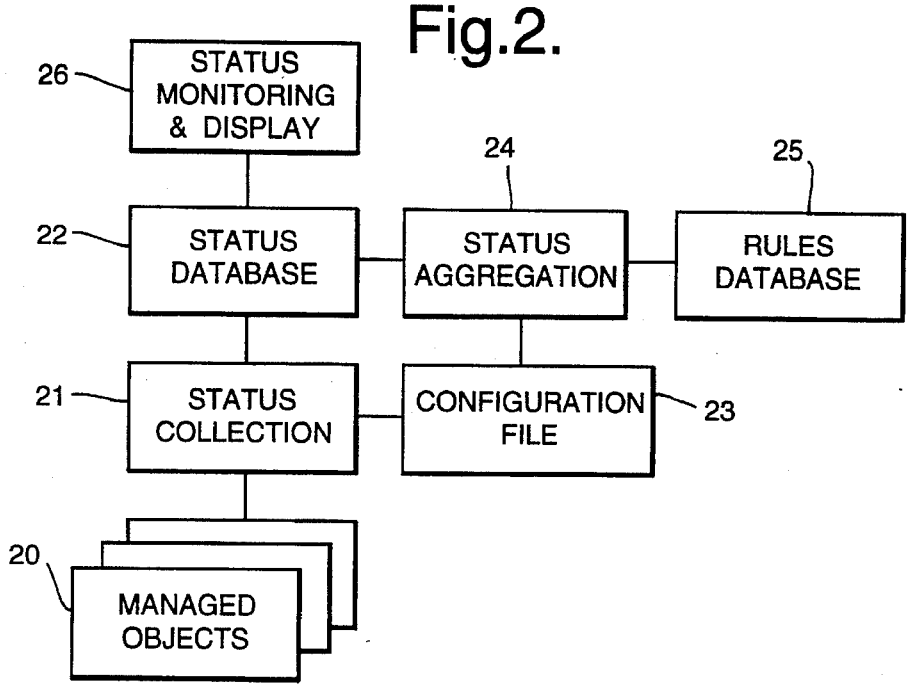
FIG. 2 is a block diagram showing the mechanism within the system for collecting and aggregating the status of managed objects.

Referring now to FIG. 2, this shows how the status values of the managed objects are collected, aggregated and displayed.

In this figure, the managed objects 10–15 of FIG. 1 are represented as a set of managed objects 20. The status values of these objects are collected by a status collection function 21, and are recorded in a status database 22. The status collection function 21 uses a configuration file 23 which holds the identities of all the managed objects in the system.

When the system is started up, the status collection function 21 polls all the managed objects 20 identified in the configuration file, and obtains their current status values. These status values are recorded in the status database 22. Subsequently, whenever one of the managed objects 20 changes its status, it sends a change of status message to the status collection function, which then updates the status database accordingly.

The status database 22 also holds status values for the composite managed objects 16–18. A status aggregation function 24 calculates the status values for these composite managed objects, according to a set of aggregation rules held in a rules database 25. This status aggregation is performed whenever the status collection function updates the status of any member of a composite managed object.

A status monitoring and display function 26 accesses the status database, in response to commands from the system operator, and displays the status of the managed objects or composite managed objects. The system operator can choose to view the status at any selected level: for example, the operator will normally view only the status of the highest-level composite managed object (ie the database server 18 in FIG. 1), and will selectively view the status of the lower-level objects only if more detailed information is required about the system.

The aggregation rules, in this example, consist of a set of threshold values for each composite managed object. Each set contains threshold values for the unknown, disabled, no heartbeat, no report, no control, enabled, busy and active operational states, and for the unknown, locked, shutting down and unlocked administrative states. Each composite managed object has its own separate set of threshold values associated with it.

Figure 3:
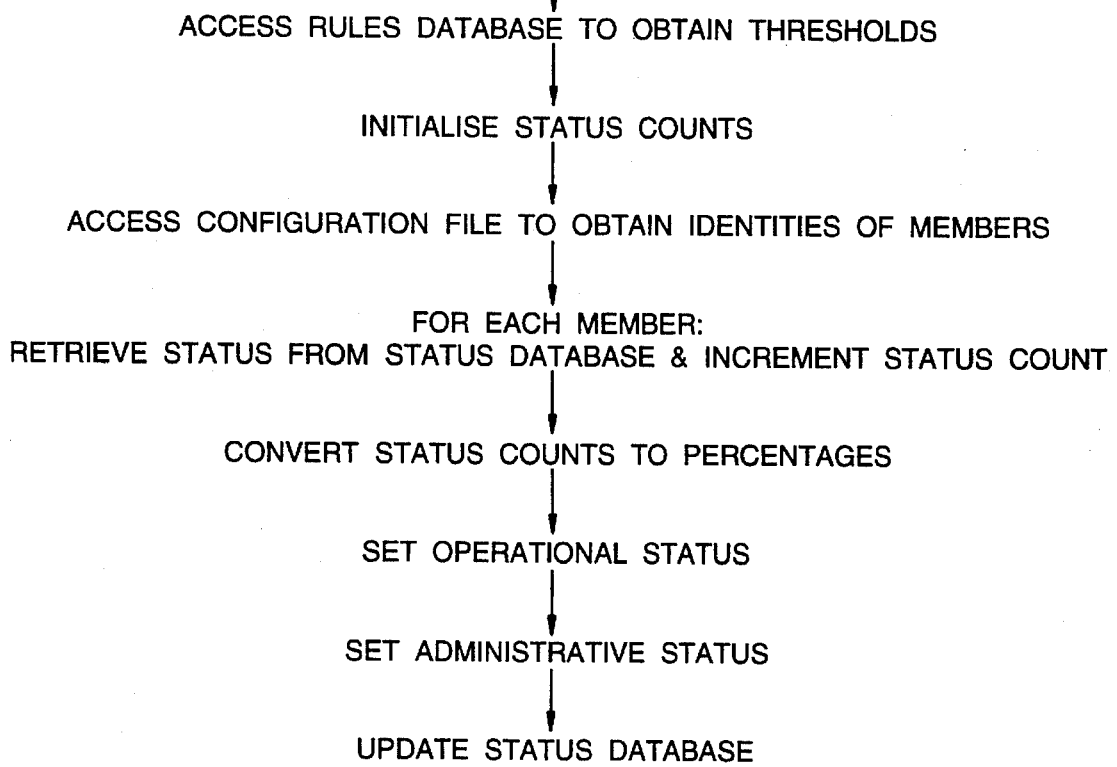
FIG. 3 is a flow chart showing the status aggregation mechanism in more detail.

Referring to FIG. 3, this shows the operation of the status aggregation function 24 in more detail. As mentioned above, this function 24 is called whenever the status of a member of a composite managed object is changed.

The status aggregation function first accesses the rules database 25 to obtain the threshold values for the composite managed object in question.

A set of status counts, one corresponding to each possible status value, is created and initialised to zero.

The function then accesses the configuration file 23 to obtain the identities of the members of that composite managed object.

The status of each member of the composite managed object is then retrieved from the status database, and the appropriate status counts are incremented. For example, if the member has operational status "busy", then the "busy" status count is incremented by one.

Each status count is then converted into a percentage value, by dividing it by the total number of members in the composite object and multiplying the result by 100.

The operational status of the composite managed object is then set by means of the procedure as defined by the following pseudo-code:

```
/* set operational status */
if disabled count exceeds disabled threshold
    set operation status to disabled
else if no_heartbeat count plus
    disabled count exceeds no_heartbeat threshold
    set operational status to no_heartbeat
else if no_report count plus
    no_heartbeat count plus
    disabled count exceeds no_report threshold
    set operational status to no_report
else if no_control count plus
    no_report count plus
    no_heartbeat count plus
    disabled count exceeds no_control threshold
    set operational status to no_control
else if enabled count plus
    no_control count plus
    no_report count plus
    no_heartbeat count plus
    disabled count exceeds enabled threshold
    set operational status to enabled
else if busy count exceeds busy threshold
    set operational status to busy
else if active count exceeds active threshold
    set operational status to active
else set operational status to unknown
```

Thus, it can be seen that the possible status values are considered in a fixed order of precedence. At each step, if the percentage of members with a particular status exceeds the relevant threshold value, the composite managed object is set to that status. If the threshold value is not exceeded for the disabled, no heartbeat, no report or no control status, the percentage of members with that status is carried forward and added to next status percentage before comparison with the threshold.

The administrative status of the composite managed object is then set by means of the procedure as defined by the following pseudo-code.

```
/* set administrative status */
If locked count exceeds locked threshold
    set status to locked;
Else if shutting_down count exceeds shutting_down threshold
    set status to shutting_down
```

```
Else if unlocked count exceeds unlocked threshold
    set status to unlocked
Else set status to unknown;
```

Finally, the status database 22 is updated with the new status values for the composite managed object.

By varying the threshold values, different aggregation rules can be specified, so that it is possible to vary the ay in which the status values are aggregated according to the user's requirements or preferences. Other aggregation functions may also be employed, and, if desired, a different aggregation function may be used for each managed object.

It should be noted that the data processing system described above may be linked to other data processing systems (not shown) to form a distributed data processing network. The status aggregation technique described above can be used to make up composite managed objects from managed objects that are physically situated anywhere within such a distributed network.

We claim:

1. A data processing system comprising:
   (a) a plurality of managed objects;
   (b) means for defining at least one composite managed object, said composite managed object being defined as a combination of a plurality of said managed objects;
   (c) a status database for holding a plurality of status values;
   (d) status collection means, coupled to said managed objects, for collecting status values from said managed objects and recording said status values in said status database;
   (e) counting means, coupled to said status database, for forming a count value indicating how many of said managed objects within said composite managed object have a predetermined status value;
   (f) comparing means, coupled to said counting means, for comparing said count value with a threshold value and, when said count value exceeds said threshold value, for assigning a predetermined composite status value to said composite managed object and recording said composite status value in said status database; and
   (g) display means, coupled to said status database, for displaying said status values for said managed objects and said composite status value for said composite managed object.

2. A system according to claim 1 wherein said predetermined status value is a value indicating that said managed objects are in a locked state, and said predetermined composite status value is a value indicating that said composite managed object is in a locked state.

3. A system according to claim 1 wherein said managed objects include a plurality of data processing elements.

4. A system according to claim 3 wherein said managed objects include a tile system for said plurality of data processing elements.

5. A system according to claim 3 wherein said managed objects include a communications facility for said plurality of data processing elements.

6. A system according to claim 3 wherein said managed objects include a power supply for said plurality of data processing elements.

7. A system according to claim 1 wherein said managed objects include a plurality of database services and a plurality of databases.

8. A method of monitoring a plurality of managed objects in a data processing system, said method comprising:
   (a) defining at least one composite managed object, said composite managed object being defined as a combination of a plurality of said managed objects;

(b) collecting status values from said managed objects and recording said status values in a status database;

(c) forming first and second count values respectively indicating how many of said managed objects within said composite managed object have first and second predetermined status values;

(d) comparing said first count value with a first threshold value and, when said first count value exceeds said first threshold value, assigning a first predetermined composite status value to said composite managed object and recording said first composite status value in said status database;

(e) comparing said first count value plus said second count value with a second threshold value and, when said first count value plus said second count value exceeds said second threshold value, assigning a second predetermined composite status value to said composite managed object and recording said second composite status value in said status database; and (f) displaying said status values for said managed objects and said composite status value for said composite managed object.

* * * * *